(12) United States Patent
Watkins (10) Patent No.: US 6,234,803 B1
(45) Date of Patent: May 22, 2001

(54) EDUCATIONAL TREASURE HUNT GAME

(76) Inventor: Jacqueline T. Watkins, Suite 321, 205-329 North Road, Coquitlam, BC 3VJ 2X1 (CA)

( * ) Notice: Subject to any disclaimer, the term of this patent is extended or adjusted under 35 U.S.C. 154(b) by 0 days.

(21) Appl. No.: 09/488,005

(22) Filed: Jan. 20, 2000

Related U.S. Application Data (60) Provisional application No. 60/118,567, filed on Feb. 3, 1999.

(51) Int. Cl.$^7$ .............................. G09B 19/00; A63F 1/02; A63F 9/20
(52) U.S. Cl. .................... 434/156; 434/162; 434/167; 434/176; 273/299; 273/302
(58) Field of Search ..................................... 434/156, 167, 434/170, 176, 162, 165; 273/299, 300, 302, 304

(56) References Cited

U.S. PATENT DOCUMENTS

| | | |
|---|---|---|
| D. 056,985 | 1/1921 | Moore . |
| D. 146,201 | 1/1947 | Van Wagner . |
| 155,131 | 9/1874 | West . |
| D. 197,432 | 2/1964 | Maxwell . |
| 807,433 * | 12/1905 | Blanchard . |
| 958,258 * | 5/1910 | Leach . |
| 1,292,184 * | 1/1919 | Wells . |
| 1,312,278 | 8/1919 | Shinn . |
| 1,417,434 * | 5/1922 | Weiss . |
| 1,485,146 | 2/1924 | Mundell . |
| 2,756,515 | 7/1956 | Hoffman . |
| 5,417,432 | 5/1995 | Dwyer . |
| 5,772,212 | 6/1998 | Hagedorn . |

FOREIGN PATENT DOCUMENTS

| | | |
|---|---|---|
| 61087 | 3/1955 | (FR) . |
| 2137513 | 10/1984 | (GB) . |

* cited by examiner

Primary Examiner—Jacob K. Ackun, Jr.
Assistant Examiner—Bena B. Miller
(74) Attorney, Agent, or Firm—Richard C. Litman (57) ABSTRACT

An educational treasure hunt game provides for teaching young children or others the basics of writing and reading, by conducting a physical search for cards placed or concealed throughout a predetermined area in accordance with clues provided. A series of cards include pictorial representations of various articles or objects on the front face thereof, with the cards having one or more written clues on the reverse face thereof. Each clue corresponds to a pictorial representation shown on the front face of the next successive card in the series, with all of the cards being arranged in alphabetical order according to the first letter of the name of the object or article pictured. The back faces of the cards may include more than one clue, with a corresponding number of cards being provided in order to provide sufficient pictorial symbols. The game is played by placing or concealing the cards adjacent to articles or objects corresponding to their pictorial representations. The game supervisor then reads the first clue, and players engage in a physical search for the object or article corresponding to that clue. When the object and its associated card are found, the supervisor reads a clue from the discovered card, and the process continues. Players are provided with a board and marker to record the first letter or the name of the object depicted on each card found. One or more prizes may be provided at the end of the search, if desired.

19 Claims, 8 Drawing Sheets

EDUCATIONAL TREASURE HUNT GAME

REFERENCE TO RELATED PATENT APPLICATION

This application claims the benefit of U.S. Provisional patent application Ser. No. 60/118,567, filed on Feb. 3, 1999.

BACKGROUND OF THE INVENTION

1. Field of the Invention

The present invention relates generally to educational games, and more specifically to a game for teaching young children the basics of writing and reading by having them search for and find progressive clues to objects found in the household and/or area. A series of progressive, sequential clue cards are placed or concealed, with a supervisor reading a clue for each clue card and players seeking out those cards sequentially and writing the letter or name of the object found.

2. Description of the Related Art

Learning to write and read can be difficult for most small children, yet it is an absolute requirement for practically everyone in the world today. Any means which may be devised to assist small children, and early writers and readers, in learning these skills, is of value, particularly if the means provides enjoyment to those using the means.

Accordingly, various games and the like have been developed in the past for assisting people (primarily children) in learning to write and/or read. Almost all such relatively recently developed games involve computers, which greatly increases the cost and complexity involved and does not provide any physical activity for the players. Various "flash card" and similar games or teaching means have been developed in the past, but none involving a sequential "treasure hunt" type of game, with the clue cards being placed or concealed with objects corresponding to the specific cards. The present invention provides both an apparatus and method of playing such a game, for teaching small children and/or early writers and readers, the basics of writing and reading.

A discussion of the related art of which the present inventor is aware, and its differences and distinctions from the present invention, is provided below.

U.S. Pat. No. 155,131 issued on Sep. 15, 1874 to Presbury West, titled "Game-Cards," describes a rebus puzzle type arrangement, with some of the cards having letters of the alphabet thereon and others having pictorial symbols thereon which may be combined with the alphabet letters to form representations of words, phrases, and sentences. West does not disclose any particular sequential symbols corresponding to the sequence of the alphabet, as provided by the present apparatus, nor does he disclose any particular method of playing a game, nor of teaching beginning writers and readers how to write and read, as provided by the present game invention.

U.S. Pat. No. 1,312,278 issued on Aug. 5, 1919 to Jeannette C. Shinn, titled "Card Game," describes a game having a series of pictorial representations of various objects, and a series of alphabet letters with sufficient duplication to provide for forming words corresponding to the various objects shown pictorially on other cards. Each of the pictorial cards includes a letter corresponding to the beginning letter of the word representing the object (e. g., M for "Mask" or "Mill," etc.). However, Shinn does not provide any corresponding objects, clues, or letters on the reverse side of any of the cards, as provided by the present game apparatus. The cards of the present game each have one or more clues thereon, with these clues corresponding to a pictorial representation formed on another card which is in alphabetic sequence with the first card. Moreover, Shinn does not disclose any form of treasure hunt type game, as provided by the cards of the present invention.

U.S. Pat. No. 1,485,146 issued on Feb. 26, 1924 to Roscoe Mundell, titled "Educational And Game Cards," describes a series of cards having multiplication tables thereon, with letters of the alphabet and corresponding symbols on the reverse sides of some of the cards. Mundell discloses some games which might be played using his cards, in addition to using them as teaching aids for learning arithmetic and multiplication tables. However, none of the games of the Mundell patent involve any physical search for an object corresponding to a clue, which in turn corresponds to a letter of the alphabet, with clues given in alphabetical order.

U.S. Pat. No. 2,756,515 issued on Jul. 31, 1956 to Harold J. Hoffman, titled "Alphabet Order," describes an accordion type file folder divided into a plurality of slots in alphabetical order, along with a series of cards each having a letter of the alphabet thereon and a pictorial representation of an article which name begins with the same letter. The game of the Hoffman patent consists of nothing more than removing the cards from the file folder, and refiling them in alphabetical order. The articles provided on the Hoffman cards do not provide sequential clues for each successive card on the back of each corresponding preceding card for use in a physical search or hunt, as in the present invention.

U.S. Pat. No. 5,417,432 issued on May 23, 1995 to Priscilla J. Dwyer, titled "Alphabet Playing Card Deck," describes a game having a series of cards, each having a letter of the alphabet thereon. The cards may include pictorial representations of articles which names begin with the corresponding letter of the card. However, Dwyer does not disclose any sequential clues provided on cards and directed to respective successive cards in the deck, as provided by the present invention, nor does she describe any form of search, hunt, or other physical game which may be played using such cards, as provided by the present educational treasure hunt game.

U.S. Pat. No. 5,772,212 issued on Jun. 30, 1998 to Rhonda F. Hagedorn, titled "Multi-Functional Alphabet Cardgame W/Optional Diamonoidal Cards," describes a series of cards having pictorial representations of objects which names begin with corresponding letters printed on the cards, somewhat like the cards of the Shinn, Mundell, Hoffman, and Dwyer U.S. Patents discussed further above. The Hagedorn disclosure is directed to the use of the disclosed cards for forming words, rather than for searching for a corresponding article, as provided by the present game apparatus and method. Accordingly, Hagedorn does not provide any clues on the backs of her cards, directed to a description of an article or object represented on the front of a succeeding card in the card order, as provided by the present invention.

U.S. Pat. No. D-56,985 issued on Jan. 25, 1921 to Claudia Moore, titled "Set Of Alphabet Cards," illustrates a design for a series of cards each having a different letter of the alphabet thereon and a pictorial representation of an article or object which name begins with the same letter. The reverse side of each card has a corresponding letter of the alphabet thereon, with no pictorial representations. Moore does not disclose any clues relating to the identity of an object or article depicted on the next successive card in the group, as provided by the present invention, nor does her design patent describe any method of playing a game using her cards, whereas the present educational game invention includes a method of play and variations thereon.

U.S. Pat. No. D-146,201 issued on Jan. 7, 1947 to Ethel C. Van Wagner, titled "Set Of Playing Cards," illustrates a series of cards each having a pictorial representation thereon corresponding to an accompanying letter of the alphabet. No disclosure of the opposite sides of the cards is provided, nor is any disclosure made of any form of game which might be played using the cards of the Van Wagner design patent.

U.S. Pat. No. D-197,432 issued on Feb. 4, 1964 to Clifford Maxwell, titled "Deck Of Educational Cards For Learning Morse Code," illustrates a series of cards each having a pictorial representation of an object or article thereon, the corresponding name of the object or article, the first letter of the name, and the Morse code for that letter. No disclosure is made of the opposite sides of the cards, nor is any disclosure made of any form of game which might be played using the cards of the Maxwell design patent.

French Patent Publication No. 61,087 published on Mar. 23, 1955 to Andre Hugueville illustrates exemplary cards, with one having a pictorial representation thereon and the other showing a letter of the alphabet thereon. No clues are apparent for directing a player on a physical search for a subsequent card in the sequence, as provided by the present educational game invention.

Finally, British Patent Publication No. 2,137,513 published on Oct. 10, 1984 to Kamil M. A. Al-Najjar, titled "Alphabet Card Game," describes a game having a plurality of cards each having a letter of the alphabet thereon. No pictorial representations or symbols are provided in the Al-Najjar cards and game. The game disclosed is quite similar to Scrabble (tm), but played using cards, rather than a board and letter tiles. Al-Najjar does not disclose any form of physical search game, nor any means of playing such a game using his cards.

None of the above inventions and patents, taken either singly or in combination, is seen to describe the instant invention as claimed.

SUMMARY OF THE INVENTION

The present invention comprises an educational treasure hunt game, in which young children or others may learn the basics of writing and reading. The game apparatus includes a series of cards corresponding to the letters of the alphabet, with each card having one or more clues provided thereon describing an object or article found in the household or game area. The opposite side of each card includes a pictorial representation of the article described in the clue of the previous card, and the name of the article. (The first card has no specific pictorial representation, and the last card has no written clue.)

The cards (excepting the first card) are placed or concealed in various areas of the household or game area, in locations corresponding to the object or article of the object or article pictured thereon. An adult or other supervisor reads the first clue provided on the first card, and players seek out the card which has been placed or hidden with the object or article to which the first clue is directed. When that card is located, the players note and write the first letter or the name of the article on erasable boards which have been provided with the game. The supervisor then reads the clue provided on the just located card, which leads players to the next object or article and card which has been placed or hidden therewith. The game continues as desired, either through the entire alphabet, or perhaps for some predetermined number of letters or time period. The last card clue may direct players to one or more prizes provided with the game.

Accordingly, it is a principal object of the invention to provide an improved educational treasure hunt game for teaching young children or others, beginning writing and reading skills in an enjoyable manner.

It is another object of the invention to provide an improved educational game having a series of cards, with each of the cards corresponding to a letter of the alphabet and (excepting the first card) having a pictorial representation of an article or object thereon and corresponding first letter of the name of the article, and (excepting the last card) having a clue describing the article or object corresponding to the next letter of the alphabet.

It is a further object of the invention to provide an improved educational game in which the cards (excepting the first card) are placed or concealed with an object or article corresponding to the article or object pictured on the card.

An additional object of the invention is to provide an improved educational game in which a first clue is read and players conduct a physical search for the object corresponding to the first clue to find the corresponding card, with the next clue then being read from the discovered card, and so on to completion of the game.

Still another object of the invention is to provide an improved educational game including means for players to record the first letter of the object or name of the object corresponding to each card found, and one or more prizes which are located at the end point of the game.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises an educational treasure hunt game, for teaching small children or others the basics of writing and reading in an enjoyable manner. The present game includes a series of cards representing the letters of the alphabet, with the cards being retained in sequential alphabetical order. Most of the cards include a pictorial symbol on one side or face thereof representing a household or other common object in the area, with the opposite side or face having at least one clue thereon which may be read to direct players to the next clue card.

Figure 1A:
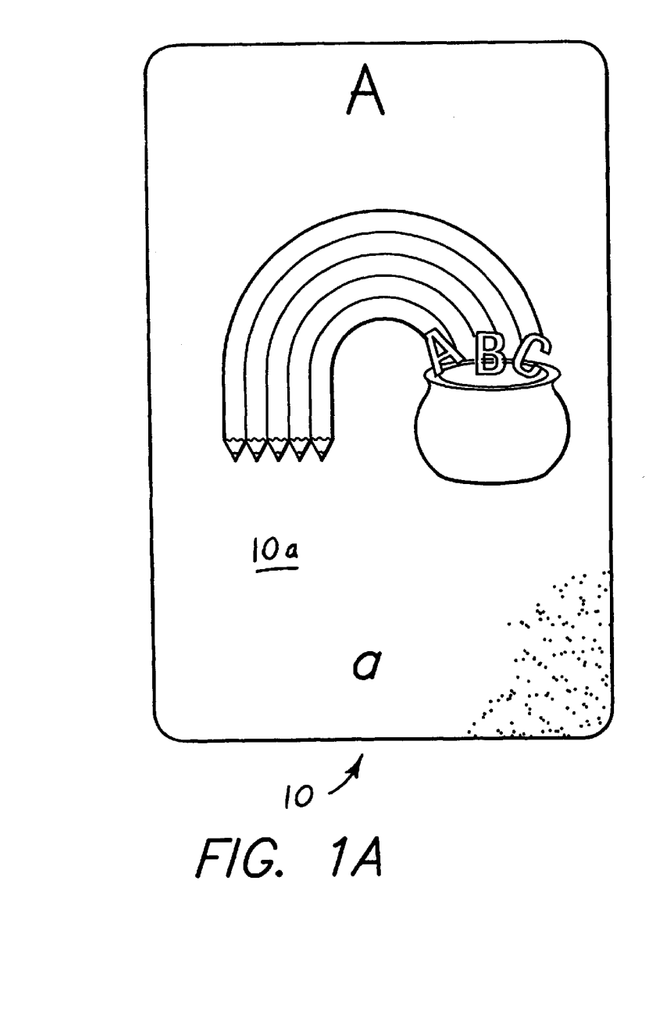
FIG. 1A shows the front face of a first card in the series.
Figure 1B:
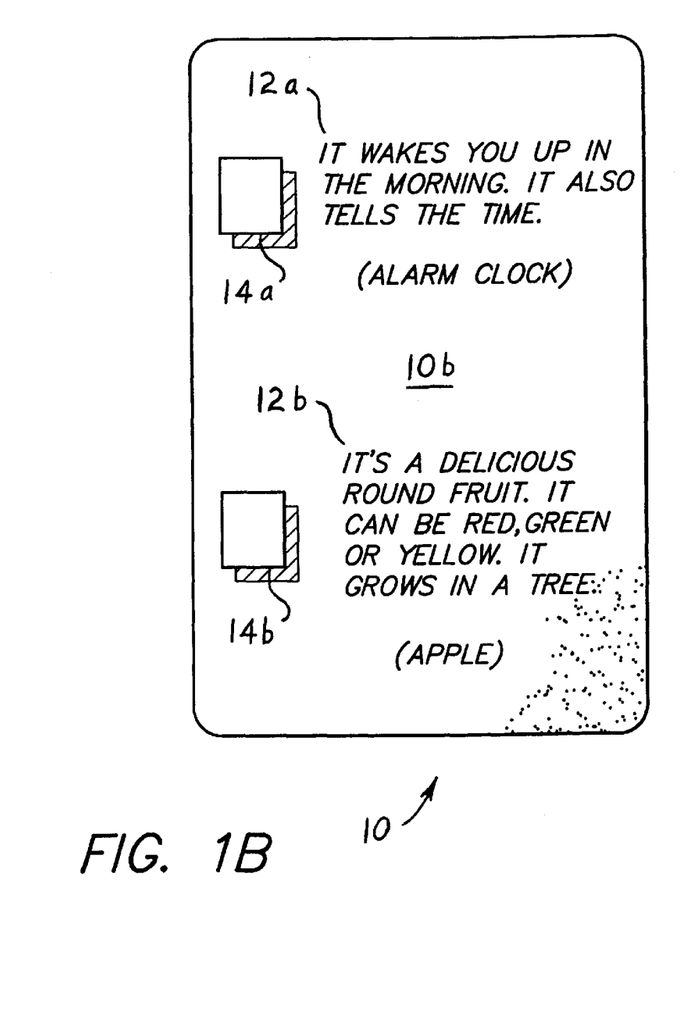
FIG. 1B shows the back face of the card of FIG. 1A, with two different clues provided thereon respectively corresponding to the front faces of the cards of FIGS. 2A and 2B.

The first card 10 is shown in FIGS. 1A and 1B, with the front or first face 10a of the card 10 being unmarked, or perhaps having a general pictorial symbol thereon, e. g., the "ABC" and "writing rainbow" symbol shown in FIG. 1A. The face 10a of the first card 10 is not critical to the play of the present game. The opposite, second side or face 10b of the card 10, shown in FIG. 1B, includes one or more written clues, e. g., 12a and 12b, with one of the clues 12a or 12b being read to the players of the game in order to enable them to seek out an object corresponding to the clue which is read. The second card in the series is placed or hidden adjacent to the object.

The present game may be played using only a single set of clues and corresponding objects, if so desired. However, the provision of two (or more) clues on the second face of each of the cards, permits the supervisor of the game to select which clue will be used, and accordingly which object and corresponding pictorial card will be used during the game for greater variety. Accordingly, each clue 12a and 12b, and other clues described further below, are provided with an area, respectively 14a and 14b, which may be marked by the supervisor to indicate which clue 12a or 12b should be read, and which corresponding subsequent card has been placed or hidden with the corresponding object or article referenced by the clue 12a or 12b which is used for that particular game.

Figure 2A:
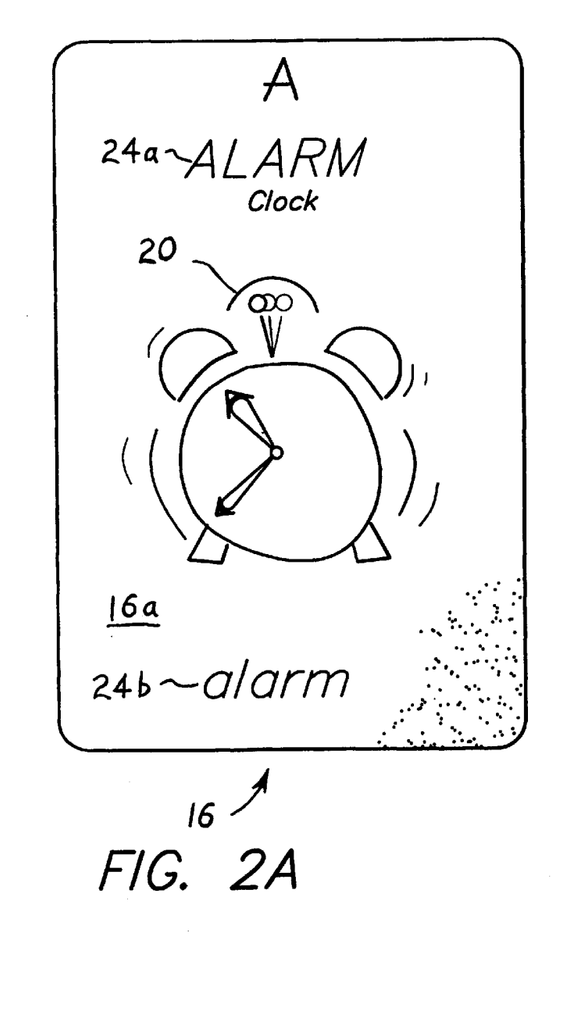
FIGS. 2A and 2B respectively show alternative pictorial representations corresponding to the two clues provided on the back face of the card as shown in FIG. 1B.
Figure 2B:
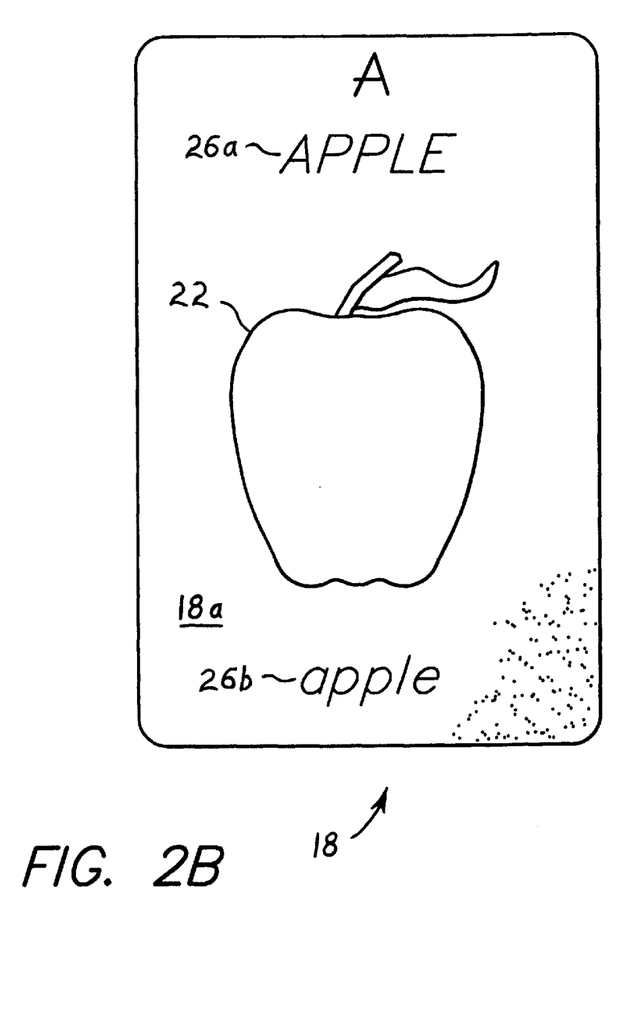

As there are two clues 12a and 12b provided on the second face 10b of the card 10, two second cards, respectively 16 and 18 (shown in FIGS. 2A through 2C), are provided. Only one second card would be required if only one clue were provided on the second face 10b of the first card 10. Conversely, if three different clues were provided, then three different second cards would be required, and so forth, depending upon the number of different clues provided on each card. The first faces, respectively 16a and 18a, of the two cards 16 and 18 include pictorial representations of the respective articles or objects described by the two clues 12a and 12b of the second face 10a of the first card 10, with the first faces 16a and 18a of the cards 16 and 18 being shown respectively in FIGS. 2A and 2B. Each of the faces 16a and 18a includes a pictorial representation, respectively 20 and 22, of the article or object described by the respective clue 12a and 12b of the second face 10b of the preceding card 10, with the corresponding first letter and name of the object being provided in both upper case and lower case letters, respectively 24a and 24b on the face 16a of card 16, and 26a and 26b on the face 18a of card 18.

Figure 2C:
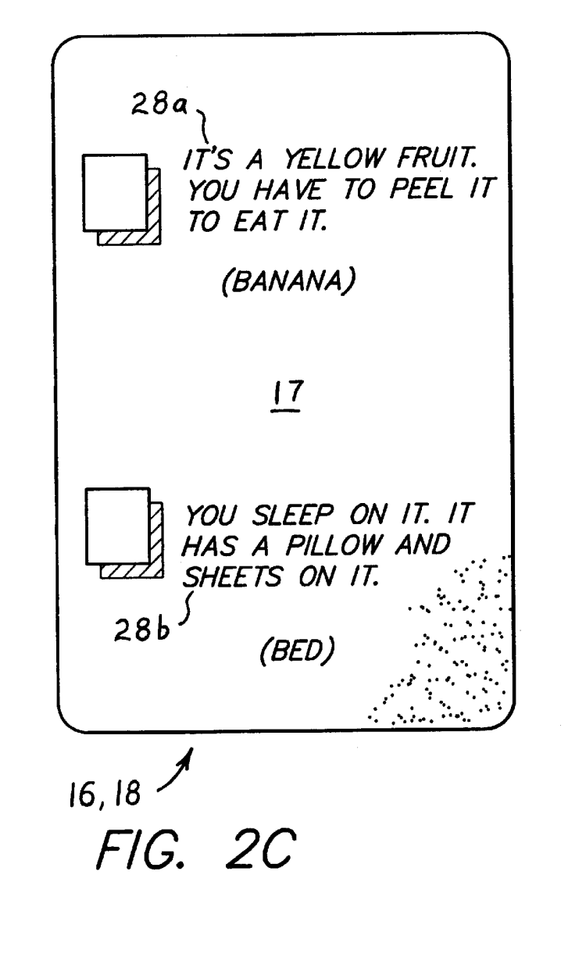
FIG. 2C shows the back face of the cards of FIGS. 2A and 2B and includes two alternative clues thereon respectively corresponding to the front faces of the cards of FIGS. 3A and 3B.

The opposite second face 17 of the second cards 16 and 18 is shown in FIG. 2C of the drawings. It will be seen that as the two cards 16 and 18 serve as alternates for the two clues 12a and 12b of the first card 10, that both have identical second faces 17 with identical subsequent clues 28a and 28b. Thus, if the supervisor of the game has used clue 12a of the first card 10, and correspondingly used card 16 of FIG. 2A, the second face 17 of the card 16 would provide two additional clues from which the supervisor may choose to continue the sequential location of the clue cards in alphabetical order. On the other hand, if the supervisor had selected the second clue 12b of the first card 10, then he or she would have used card 18 of FIG. 2B to correspond with the clue 12b. The second face of the card 18 is identical to the second face of card 16, as shown in FIG. 2C, due to the interchangeable nature of the two cards 16 and 18, depending upon which previous clue 12a or 12b was selected.

Figure 3A:
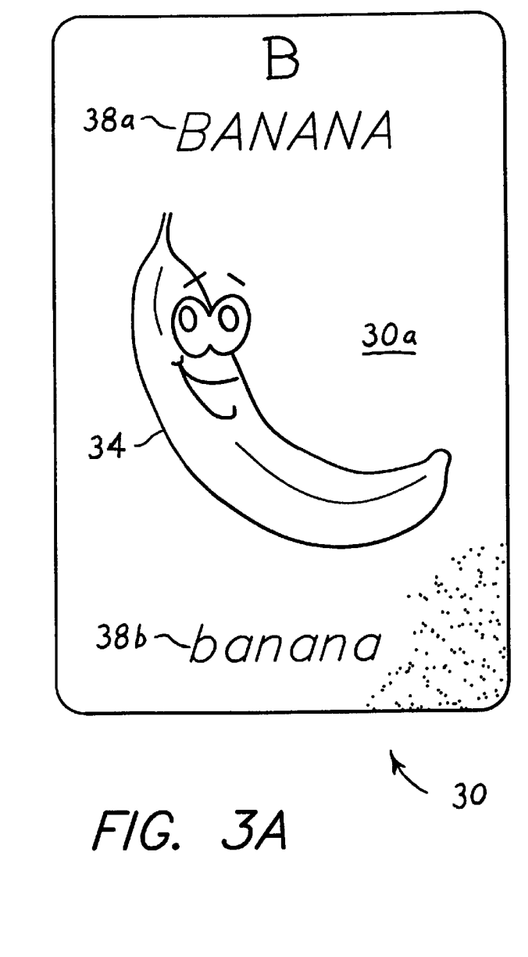
FIGS. 3A and 3B respectively show alternative pictorial representations corresponding to the two clues provided on the back face of the card as shown in FIG. 2C.
Figure 3B:
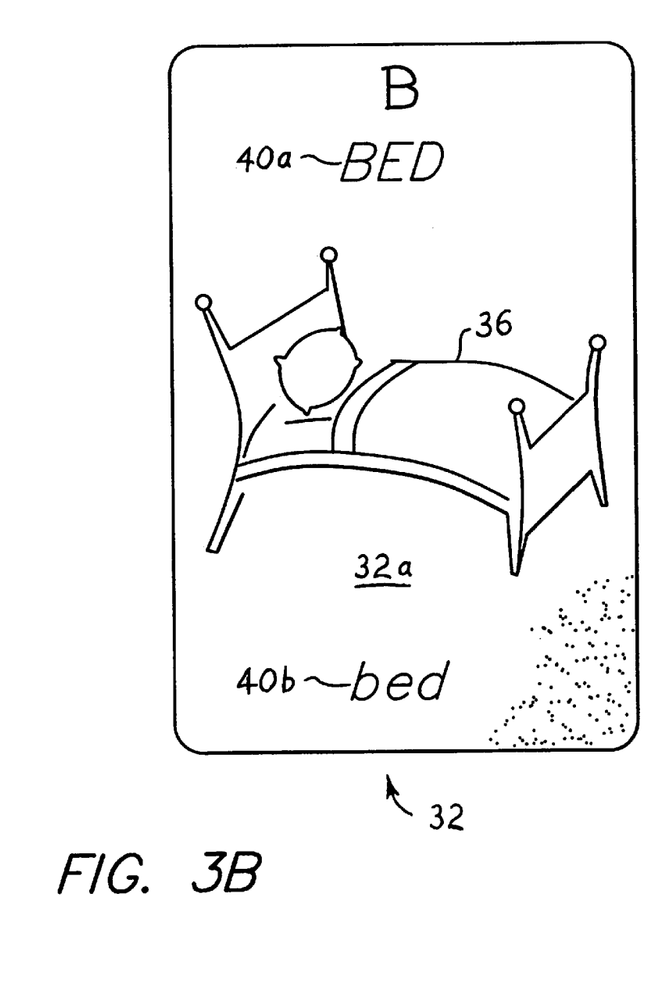
Figure 3C:
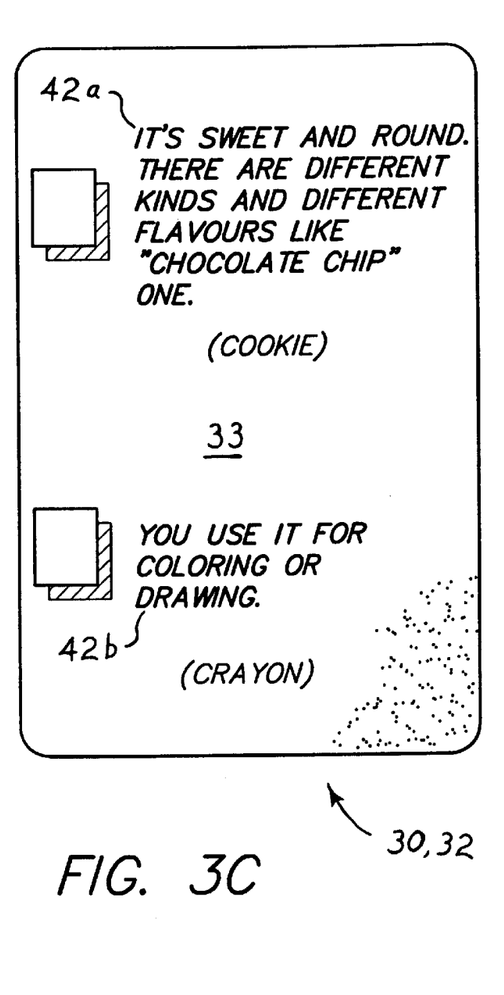
FIG. 3C shows the back face of the cards of FIGS. 3A and 3B and includes two alternative clues thereon respectively corresponding to the front faces of the cards of FIGS. 4A and 4B.

FIGS. 3A through 3C illustrate the first faces (FIGS. 3A and 3B) and opposite second faces (FIG. 3C) of the third cards of the present teaching game. As in the case of the relationship between the single first card 10 of the present game and the two secondary cards 16 and 18 corresponding to the two clues 12a and 12b of the first card 10, the two clues 28a and 28b of the second face 17 of the cards 16, 18 require that a corresponding card, respectively 30 and 32, be provided for each clue 28a and 28b. The first face 30a of the card 30 is shown in FIG. 3A, with the first face 32a of the card 32 being shown in FIG. 3B.

Each of the first faces 30a and 32a of the two cards 30 and 32 includes a pictorial representation, respectively 34 and 36, of the article or object described by the respective clue 28a and 28b of the second face 17 of the preceding cards 16 and 18, with the corresponding first letter and name of the object being provided in both upper case and lower case letters, respectively 38a and 38b on the face 30a of card 30, and 40a and 40b on the face 32a of card 32. This arrangement will be seen to parallel that of the first card 10 of FIGS. 1A and 1B, and the two cards 16 and 18 of FIGS. 2A through 2C.

The opposite second face 33 of the third cards 30 and 32 is shown in FIG. 3C of the drawings. Again, as the two cards 30 and 32 serve as alternates for the two clues 28a and 28b of the second face 33 of the two cards 30, 32, both cards 30 and 32 have identical second faces 33 with identical subsequent clues 42a and 42b.

The relationship of the cards used in the present game continues as described above, with FIGS. 4A through 4C illustrating the first faces (FIGS. 4A and 4B) and opposite second faces (FIG. 4C) of the fourth cards of the present teaching game. As in the case of the relationship between the two secondary cards 16 and 18 of the present game and the two tertiary cards 30 and 32 corresponding to the two clues 28a and 28b of the second cards 16 and 18, the two clues 42a and 42b of the second face 33 of the cards 30, 32 require that a corresponding card, respectively 44 and 46, be provided for each clue 42a and 42b.

Figure 4A:
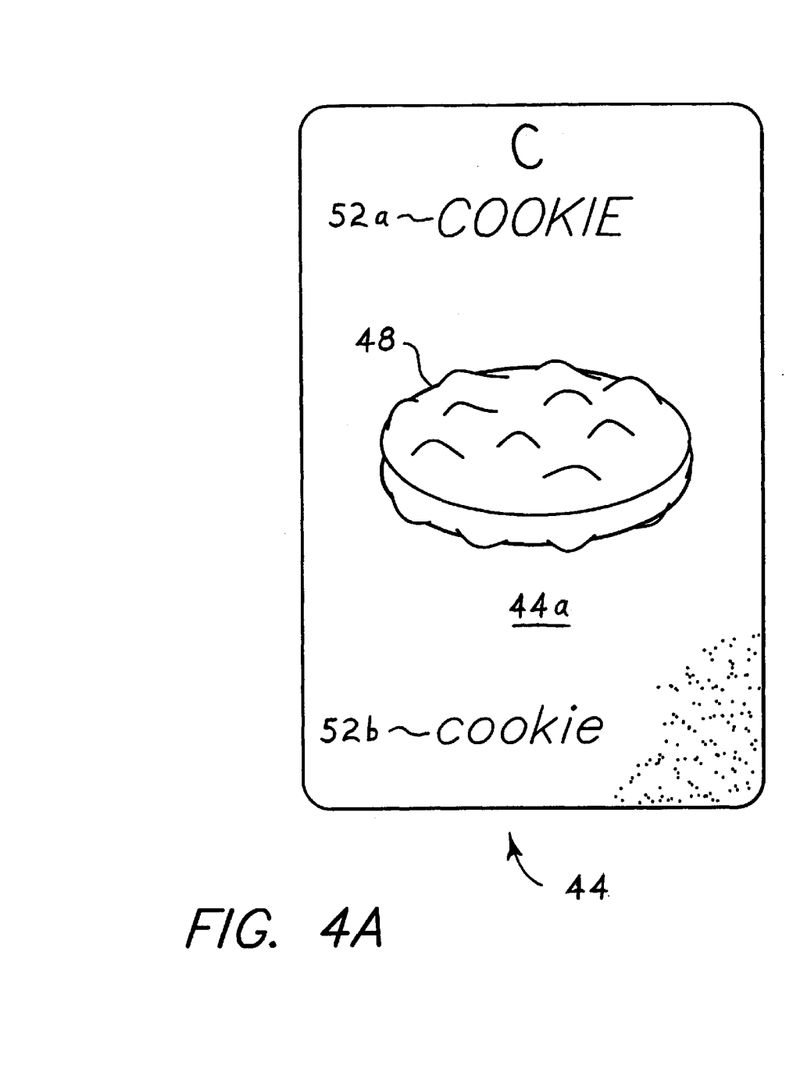
FIGS. 4A and 4B respectively show alternative pictorial representations corresponding to the two clues provided on the back face of the card as shown in FIG. 3C.
Figure 4B:
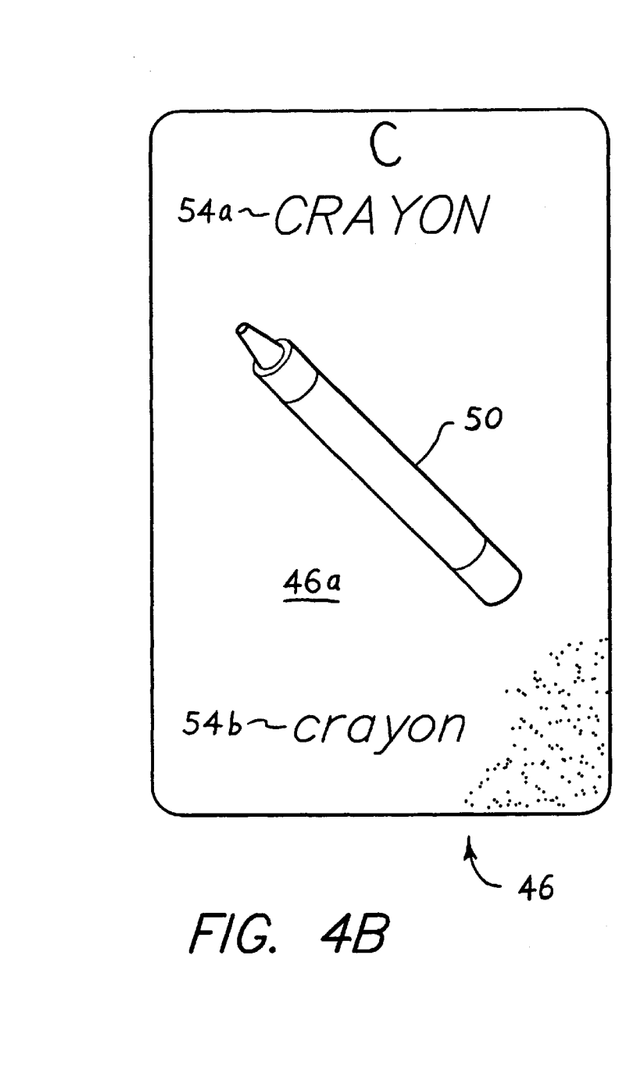
Figure 4C:
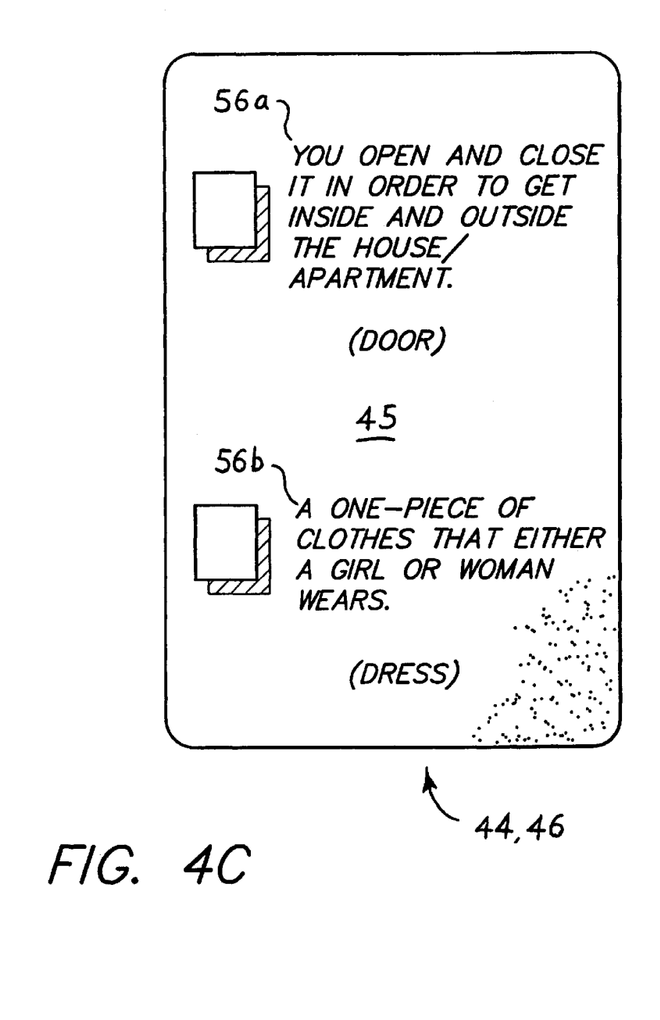
FIG. 4C shows the back face of the cards of FIGS. 4A and 4B and includes two alternative clues thereon respectively corresponding to the front faces of the cards of FIGS. 5A and 5B.

The first face 44a of the card 44 is shown in FIG. 4A, with the first face 46a of the card 46 being shown in FIG. 4B. The opposite second face 45 of the fourth cards 44 and 46 is shown in FIG. 4C of the drawings. As in the case of the cards 30 and 32 discussed above, each of the first faces 44a and 46a of the two cards 44 and 46 includes a pictorial representation, respectively 48 and 50, of the article or object described by the respective clue 42*a* and 42*b* of the identical second face 33 of the preceding cards 30 and 32, with the corresponding first letter and name of the object being provided in both upper case and lower case letters, respectively 52*a* and 52*b* on the face 44*a* of card 44, and 54*a* and 54*b* on the face 46*a* of card 46. Again, as the two cards 44 and 46 serve as alternates for the two clues 42*a* and 42*b* of the second face 33 of the two cards 30, 32, both cards 44 and 46 have identical second faces 45 with identical subsequent clues 56*a* and 56*b*. This arrangement will be seen to parallel that of the first card 10 of FIGS. 1A and 1B and the two cards 16 and 18 of FIGS. 2A through 2C, and other related card sets as described above.

Figure 5A:
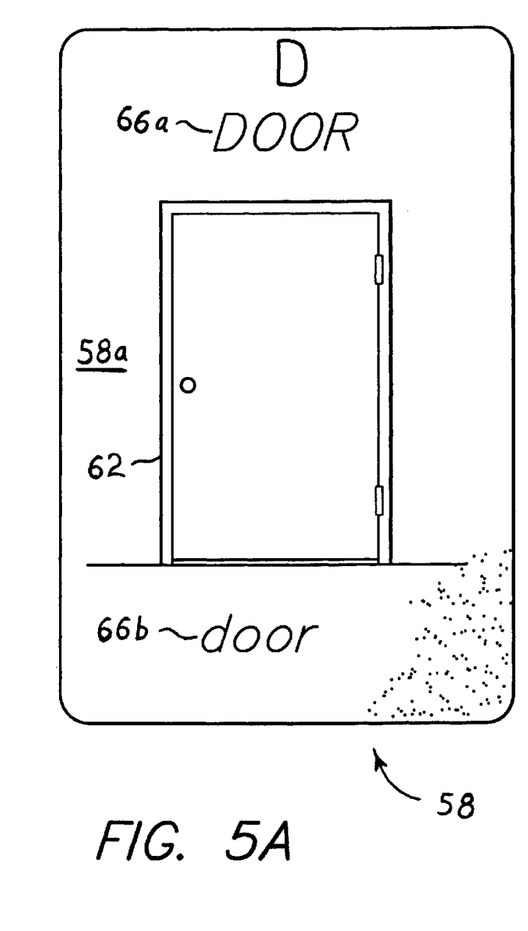
FIGS. 5A and 5B respectively show alternative pictorial representations corresponding to the two clues provided on the back face of the card as shown in FIG. 4C.
Figure 5B:
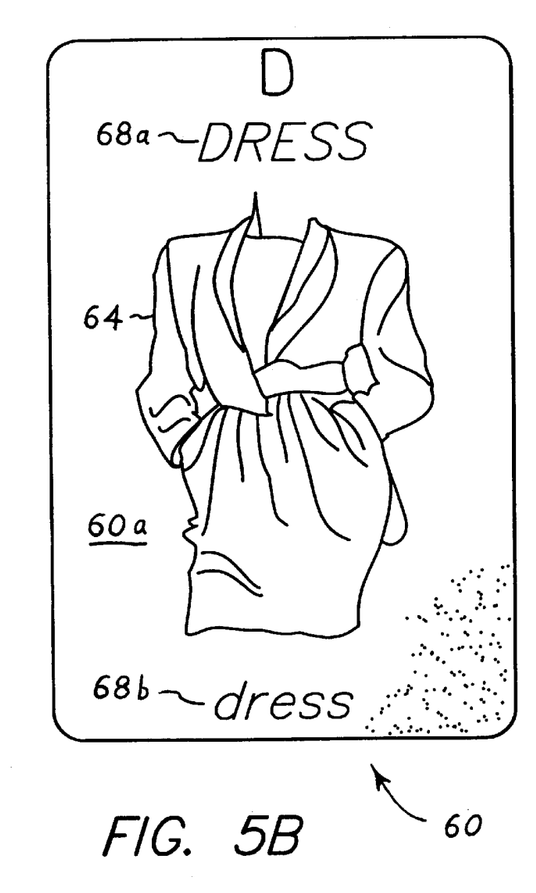

As in the case of the sequential order of cards described to this point, the two clues 56*a* and 56*b* refer to two different subsequent "D" cards, respectively card 58 of FIG. 5A and card 60 of FIG. 5B. Each of the first faces 58*a* and 60*a* of the two cards 58 and 60 includes a pictorial representation, respectively 62 and 64, of the article or object described by the respective clue 56*a* and 56*b* of the identical second face 45 of the preceding cards 44 and 46, with the corresponding first letter and name of the object being provided in both upper case and lower case letters, respectively 66*a* and 66*b* on the face 58*a* of card 58, and 68*a* and 68*b* on the face 60*a* of card 60. Again, as the two cards 58 and 60 serve as alternates for the two clues 56*a* and 56*b* of the second face 45 of the two cards 44, 46, both cards 58 and 60 have identical second faces (not shown) with identical subsequent clues (not shown).

The above described sequential order of cards is continued throughout the alphabet, with a total of fifty three cards in the case of a card set with two clues for each letter of the alphabet. (One initial clue card, plus two sets of cards for each of the twenty six letters of the alphabet.) In the case of three clues being provided for each letter of the alphabet, an initial clue card would be provided, with three cards for each of the twenty six letters of the alphabet, or a total of seventy nine cards. It will be seen that the number of cards is equal to the number of clues provided on each card, multiplied by the number of letters in the alphabet, plus one initial clue card. It will also be apparent that the present game may be applied to other languages than English, with differing numbers of letters in the alphabet of the given language. The principle remains the same, with the number of cards provided for the game being equal to the number of clues on each card, multiplied by the number of letters in the given alphabet, plus one initial card.

Figure 6:
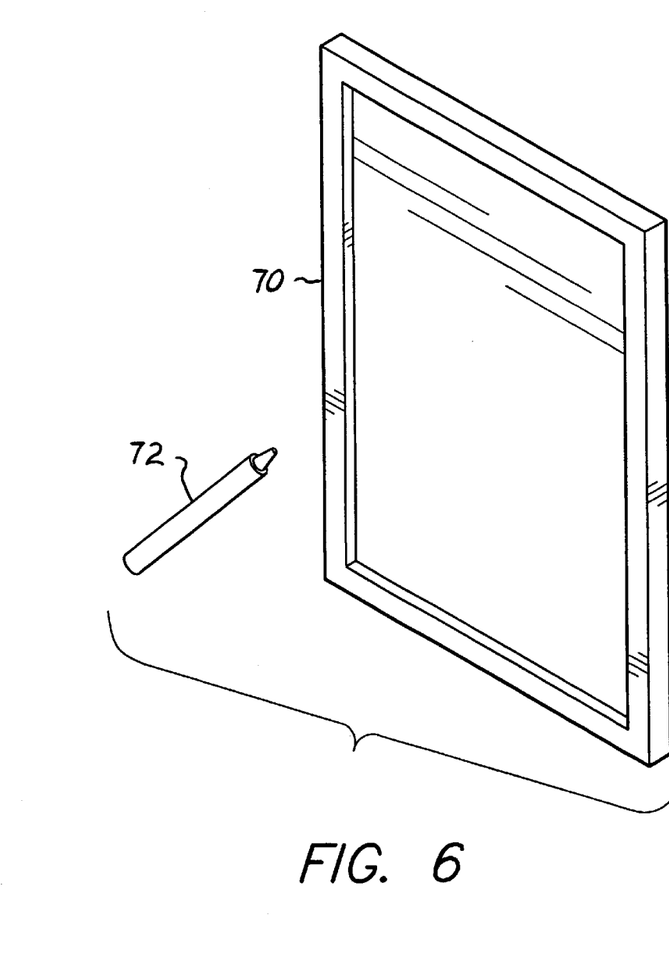
FIG. 6 shows a writing board and marker for use in the game.
Figure 7:
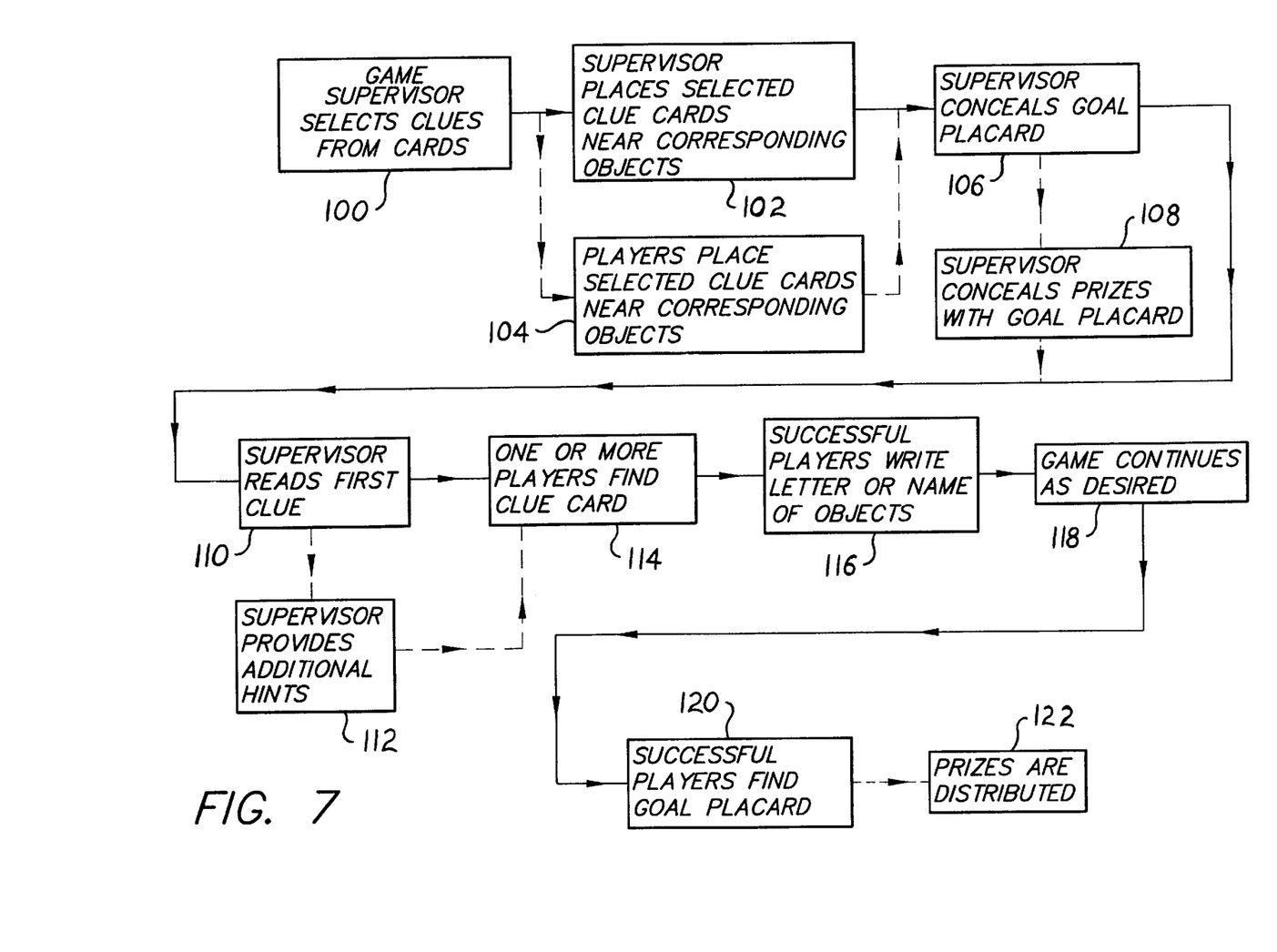
FIG. 7 is a flow chart showing the steps of the method of play of the present game.

The present game is played generally in accordance with the steps of the flow chart of FIG. 7 of the drawings. Each player is provided with an erasable board and marker, respectively 70 and 72 shown in FIG. 6, or some other means of recording the discovery of the cards during the progress of the game. The supervisor of the game (adult or other responsible person who reads and writes fluently in the language of the game) first selects appropriate clues from the cards, as indicated in the first step 100 of the flow chart of FIG. 7, prior to placing or concealing the game cards (excepting the first card 10 of FIGS. 1 and 2).

It will be seen that the supervisor is not restricted to only the first clue of each of the game cards, but may choose among the clues in accordance with the availability of corresponding objects or articles in the playing area (household or residential property, school room or school yard, etc.). In other words, the supervisor may select the first clue 12*a* of the first card 10 (alarm clock), the second clue 28*b* of card(s) 16 (and 18), the first clue of the next card, etc., if so desired. The appropriate box or area 14*a* or 14*b* (indicated on the second face lob of the card 10 of FIG. 1B, and shown on the other second faces of the cards shown in the drawing Figures) is marked, so the supervisor can recall which clue was used at each step of the game, and accordingly which objects or articles were used for placement or concealing the cards. The unused clues are used for play of subsequent games, but the permutations and combinations possible by randomly selecting different clues, provides great variety.

The selected second through last cards of the card group or deck, corresponding to the clues selected, are placed or concealed at appropriate locations at or adjacent to the corresponding articles or objects indicated by the clues, generally in accordance with the second step 102 of FIG. 7. It will be seen that only a single alphabetic group of cards, with one card per each letter of the alphabet, is used for any given game, as only a single clue is provided for each letter of the alphabet. The unused cards are retained for future use, for alternative play. Normally, the supervisor of the game places or conceals the cards, but in some cases it may be acceptable to allow one or more of the players to place or conceal the cards, as desired, in accordance with the optional third step 104 of the chart of FIG. 7.

A last, or goal, placard is provided, if so desired. The goal placard may be placed with the corresponding last article in the alphabetical order of placement and arrangement of the cards, as indicated by the fourth step 106 of FIG. 7. The goal placard includes a representation of a "pot of gold at the end of the rainbow." However, it will be seen that this final or goal placard does not include any further clues directing players to other locations, as this card represents the end of the game. If desired, the supervisor may place or conceal various prizes with the goal placard, as indicated by the optional fifth step 108 of FIG. 7. These prizes may comprise conventional articles, e. g., coloring crayons and/or books, etc. Preferably, sufficient prizes are provided for all players.

The first card through the penultimate card will each be provided with one or more clues thereon, with each of the clues referring to a subsequent card in the series having a pictorial representation of some household or other appropriate article or object thereon. As the first card is not placed or concealed with an object, but is used to begin the game, it need not be provided with any pictorial representation. In a similar manner, the final or goal placard need not be provided with any written or text clues thereon, as this placard represents the end of the game. Written or text clues are provided from the first card, through the penultimate card of the game.

At this point, the game is ready to begin. The supervisor reads the clue (or selected clue, if more than one clue is provided on the card) from the initial or first card of the series, as indicated by the sixth step 110 of FIG. 7. Players then seek out an object, article, or location corresponding to this first clue, and the second card which has been previously placed therewith. As the cards and clues remain in alphabetical order, this first article, object, or location where the second card has been placed, will begin with the letter "A" (e. g., alarm clock, apple, etc.). The supervisor may provide some additional hints (e. g., "getting warmer," "getting colder," etc.), in accordance with the judgment of the supervisor, as indicated by the optional seventh step 112 of FIG. 7.

When a player or players find the second card located with the "A" object or article, as indicated by the eighth step 114 of FIG. 7, he or she passes the card to the supervisor. Players also write the first letter "A" of the article (or perhaps the entire name of the object, for more advanced players) on their marking boards, as indicated by the ninth step 116 of FIG. 7. It will be seen that successful players will record the alphabet in sequence during the course of the game, thus teaching them alphabetical order and the sounds of the letters.

The supervisor then reads the clue (or selected clue) on the second face of the second card, which references an article or object beginning with the letter "B." The players again search for the object or article, and the "B" card which has been located therewith. One or more of the players will find the article and associated card, with players then writing or recording the letter "B" (or perhaps the entire name of the object, for more advanced players) on their boards. These steps, essentially identical to steps 110 through 116, are repeated throughout the course of the game, as indicated by the tenth step 118 of FIG. 7.

The game may continue through the entire alphabet, with the cards being placed or concealed with or adjacent to various articles or objects corresponding to the cards. As twenty six cards are used in the course of the English alphabet, it will be seen that such a game may be relatively lengthy. Accordingly, the game may be shortened to cover only a portion of the alphabet, or a predetermined period of time, as desired.

Normally, the game will continue until all of the cards have been found, in alphabetical order. The last, or goal placard, is placed according to the clue provided by the penultimate card, with players reaching the goal placard finding a representation of a "pot of gold at the end of the rainbow" or other indication of the goal or end of the game being reached, generally as indicated by the eleventh step 120 of FIG. 7. One or more prizes may be located with the goal placard, or otherwise provided to players, as indicated by the optional twelfth step 122 of FIG. 7. Alternatively, the goal placard and/or prizes may be located at some other random location, if desired, to encourage further search by the players.

In summary, the present educational treasure hunt game provides an economical, inexpensive, yet effective and enjoyable means of teaching young or illiterate persons the fundamentals of writing. The provision of sequential alphabetic cards enforces the concept of alphabetical order in players, as well as teaching them the individual letters of the alphabet. As a variation on the present game, more advanced players who are beginning to read, may read the clues and then search for the cards and corresponding objects according to the clues they have read themselves. The provision of a goal and one or more prizes, provides additional interest for players, and turns the task of learning to write and read, into an enjoyable activity.

It is to be understood that the present invention is not limited to the sole embodiment described above, but encompasses any and all embodiments within the scope of the following claims.

I claim:

1. An educational game, comprising:
   a series of cards, including at least a first card, a second card, a penultimate card, and a last card;
   a marking board and means for marking said marking board;
   said second card through said last card each having a first face including a pictorial representation of an article thereon and the name of the article; and
   said first card through said penultimate card each having a second face including at least one clue provided thereon, with said at least one clue corresponding to said pictorial representation of a successive said card in said series.

2. The educational game according to claim 1, wherein said first card through said last card are arranged sequentially in alphabetical order according to each respective said at least one clue and respective said pictorial representation thereon.

3. The educational game according to claim 1, wherein said series of cards includes a plurality of cards each having different pictorial representations from one another for each letter of a series of letters of the alphabet.

4. The educational game according to claim 3, wherein said series of cards includes two cards each having different pictorial representations from one another for each letter of a series of letters of the alphabet.

5. The educational game according to claim 3, including means for indicating which of said pictorial representations for each letter is selected for use in the game.

6. The educational game according to claim 1, wherein said at least one clue includes the name of the article of said corresponding pictorial representation.

7. The educational game according to claim 1, wherein each said pictorial representation includes the name of the article of the pictorial representation, in both upper case and lower case letters.

8. The educational game according to claim 1, including at least one prize for distribution at the end of the game.

9. A method of playing an educational game, comprising the following steps:
   (a) providing a series of cards, including a first card, a second card, a penultimate card, and a last card, with the second card through the last card each having a first face including a pictorial representation of an article thereon and the name of the article, and the first card through the penultimate card each having a second face including at least one clue provided thereon, with said at least one clue corresponding to the pictorial representation of a successive said card in said series;
   (b) providing a supervisor and plurality of players;
   (c) placing the second card through the last card in various locations corresponding to the respective pictorial representation of each card;
   (d) providing a goal placard, and placing the goal placard in any suitable location;
   (e) reading the at least one clue of the first card to the players;
   (f) searching for the location of the second card by the players, according to the at least one clue provided by the first card;
   (g) finding the location of the second card and the second card located therewith, by at least one of the players;
   (h) writing the first letter or name of the article corresponding to the pictorial representation of the second card; and
   (i) continuing in the above manner until arriving at the goal placard.

10. The method of playing an educational game according to claim 9, wherein the step of providing a series of cards includes providing a plurality of cards each having different pictorial representations from one another for each letter of a series of letters of the alphabet.

11. The method of playing an educational game according to claim 9, wherein the step of placing the second card through the last card in various locations corresponding to the respective pictorial representation of each card, includes having at least one of the players place the cards.

12. The method of playing an educational game according to claim 9, including the step of providing a marking board and means for marking the marking board, for each of the players.

13. The method of playing an educational game according to claim 12, including the step of recording the first letter or name of the article corresponding to the pictorial representation of the second card, on the marking board, by each of the players.

14. The method of playing an educational game according to claim 9, including the step of providing at least one prize to at least one of the players.

15. The method of playing an educational game according to claim 14, wherein the step of providing at least one prize to at least one of the players, comprises providing the at least one prize upon arriving at the goal placard.

16. The method of playing an educational game according to claim 9, including the step of providing additional hints to the players by the supervisor of the game.

17. The method of playing an educational game according to claim 9, wherein the step of placing the goal placard includes placing the goal placard at the location of an article corresponding to a predetermined intermediate letter of the alphabet.

18. The method of playing an educational game according to claim 9, wherein the step of placing the goal placard includes placing the goal placard at the location of an article corresponding to the last letter of the alphabet.

19. The method of playing an educational game according to claim 9, wherein the step of continuing until arriving at the goal placard includes the steps of:
(a) determining an end point for the game according to a predetermined time; and
(b) proceeding directly to the goal placard upon reaching the predetermined time.

* * * * *